United States Patent Office 3,013,882
Patented Dec. 19, 1961

3,013,882
METHOD FOR TREATING BEER AND THE RESULTING PRODUCT THEREOF
Richard G. Shaler, San Anselmo, Raymond L. McAdam, San Francisco, and Richard G. Shaler, Jr., San Rafael, Calif., assignors to American Tansul Company, San Francisco, Calif., a corporation of California
No Drawing. Filed June 13, 1960, Ser. No. 35,409
9 Claims. (Cl. 99—48)

This invention relates to a novel method for treating beer after fermentation has taken place and more particularly relates to the use of a new and improved stabilizing agent to be used during such a process.

The method of preparing the new and improved stabilizing agent used in this process is disclosed in my copending application Serial No. 44,487, filed June 13, 1960, and signed under oath.

Heretofore beer has been treated by adding a swelling gelling clay such as hectorite and allowing it to flocculate in a tank of beer and to settle for a period of time of considerable duration. There are also brewing processes that attempt to filter the flocculate as soon as possible. The clay and adsorbed protein and proteinaceous complexes flocculate and settle to the bottom of the tank. Such treatment not only improves the appearance of the beer and makes the beer resistant to the haze which forms in beer when it is chilled, but also affords flavor stability protection to the finished product. The treatment likewise eliminates the haze which forms when beer is subjected to vibration such as takes place during transportation or long storage.

In the heretofore described prior method of beer treatment, the clay settles out and forms a sludge on the bottom of the tank. The beer is substantially decanted and the sludge discarded. In the process where it is attempted to filter the flocculate out as soon as possible, difficulty may be encountered in that the clay may not have sufficient exposure time to the protein and proteinaceous complexes and other material before it settles in order to effectively accomplish the purpose for which it is added to the beer and difficulty is often encountered in carrying out the filtration process.

Fundamentally, in treating beer with montmorillonite clays such as hectorite, the clay adsorbs the various molecular size protein and proteinaceous complexes and heavy metal complexes that are present in the beer after it has gone through the fermentation stage of brewing. The suspended clay and its adsorbed components then agglomerate and settle to the bottom in a colloidal gel-like mass. From 1% to 10% of the liquid treated remains in the sediment as waste. Various means have been employed to reduce the quantity of lost beer as by compacting the sludge. Recovery of residual product by centrifuging of the sludge or other means has been unsatisfactory by reason of the viscous quality of the sludge. In practice various other efforts have been made to compact the sludge in order to reduce the percentage of beer entrapped therein but all such efforts have been imperfect.

The principal object of the present invention is to reduce the amount of beer which must be wasted by entrapment in the flocculated sludge. In the herein described method a higher yield of beer is obtained since there is no flocculation at all. Consequently, since there is no sludge formed and since only a very small amount of beer, if any, is entrapped in the completely suspended stabilizing agent of the present invention when it is filtered from the beer, high losses resulting from such operation are eliminated.

A further object of the present invention is to increase the exposure time of the stabilizing agent to the protein and proteinaceous complexes in the beer during the brewing process. The advantage of this object of the invention is that a final product may be obtained that is free of the possibility to a higher degree than heretofore of a haze forming due to the protein and proteinaceous complexes coming out of colloidal solution when the finished beer is subjected to chilling, vibration or storage.

Other objects of the present invention will become apparent upon reading the following specification.

The essence of the present invention is in the use of a polyvalent metallic ion modified clay, such as hectorite, in the treatment of beer in order to chill-proof and stabilize the same.

A preferred salt for modification of beneficiated hectorite is an anhydrous calcium salt, e.g., $CaCl_2$, although other salts have proved effective.

This invention is described with respect to hectorite. Hectorite is described in U.S. Department of Interior Geological Survey Professional Paper 205-B as "Minerals of the Montmorillonite Group" (1945).

In accordance with this invention, polyvalent metallic ion modified hectorite of the montmorillonite family of swelling, gelling clay has been found to be most effective. The modified clay forms an aqueous slurry and is then injected into the beer. It is held for a period of time, where it remains evenly dispersed throughout the beer with no settling taking place. The beer is then filtered and the modified clay which has adsorbed the protein and proteinaceous complexes is removed from the clear liquid. A number of types of filters may be employed to accomplish the filtration step.

Proteolytic enzymes are used to preferentially digest certain of the protein and proteinaceous complexes in the beer. Bromelin has been found to be desirable in the treating of beer in conjunction with clays. It is used in the concentration range of 3,100 to 6,000 activity units or 0.1 to 10.0 p.p.m. The general appearance and the chill-proofing of the beer is improvement with treatment by enzymes of this general class. And, in accordance with the present invention, such enzymes may be applied to the beer at various stages during the brewing process subsequent or prior to the addition of the modified clay. Whereas it is not necessary to aid the modified clay in accomplishing its function, it is desirable to add the enzymes in order to insure an improved final product.

The use of the polyvalent metallic ion modified hectorite eliminates the need for using an anti-oxydant as a flocculation augmentation. However, the anti-oxydant is still necessary to perform the function of eliminating free oxygen during the process. The polyvalent metallic ion modified clay is unaffected by the addition of the anti-oxydant with respect to its remaining in an evenly dispersed suspension throughout the beer.

In addition, the use of the modified hectorite allows the stabilizer clay to adsorb proteins and proteinaceous complexes for a period of time, usually in excess of about 24 hours, without the clay concentrating at the bottom of the settling tank and making the filtration process difficult due to variations in clay and adsorbed material concentration throughout the liquid because of the different particle size and lower inter-particle attraction. The modified clay has different physical characteristics than the unmodified clay with the result that the modified clay does not form a cohesive film as does the unmodified clay.

In accordance with the present invention, a swelling, gelling clay of the montmorillonite family, such as hectorite, which has been modified with a polyvalent metallic ion, for example, calcium, barium, magnesium, copper, aluminum or iron, is employed. The proteolytic enzyme which is used in the following examples is bromelin, which is obtained from the pineapple plant. However, it should be kept in mind that other such proteolytic enzymes may be used satisfactorily in place of bromelin; for example, pepsin, papain, ficin, and others.

By way of illustration, detailed examples are set forth below, however, it will be understood that the invention is not to be limited to the specific examples nor to the specific proportions hereinafter detailed.

EXAMPLE I 25 liters of beer were transferred to storage at 0° C. upon completion of fermentation and 200 p.p.m. calcium modified hectorite (5 gms.) in 100 ml. water slurry was proportionately injected to insure complete distribution throughout the beer. The beer was rested for 7 days at 0° C. and then filtered to brilliance (10 Nephlos units) with diatomaceous earth into a carbonating vessel and 5 p.p.m. bromelin (0.125 gm.) with 10 p.p.m. $SO_2$ (0.416 gm. sodium bisulfite-62% available free $SO_2$) dissolved in 50 ml. water was proportionately injected to insure complete distribution throughout the beer. The beer was carbonated to 2.8 volumes carbonation and rested 4 days at 0° C. then polish filtered to brilliance (10 Nephlos units), bottled and pasteurized. No sediment or sludge other than normal yeast precipitate was evident in the storage vessel, both diatomaceous earth and polish filtrations were carried out with a minimum of difficulty and the finished beer in subsequent accelerated aging tests proved to have excellent flavor stability and chill-haze stability.

EXAMPLE II 25 liters of beer were transferred to storage at 0° C. upon completion of fermentation and 5 p.p.m. bromelin (0.125 gm.) with 10 p.p.m. $SO_2$ (0.416 gm. sodium bisulfite-62% available free $SO_2$) dissolved in 50 ml. water was proportionately injected to insure complete distribution throughout the beer. The beer was rested for 4 days at 0° C. and then filtered to brilliance (10 Nephlos units) with diatomaceous earth into a carbonating vessel and 200 p.p.m. calcium modified hectorite (5 gms.) in 100 ml. water slurry was proportionately injected to insure complete distribution throughout the beer. The beer was carbonated to 2.8 volumes carbonation and rested 7 days at 0° C., then polish filtered to brilliance (10 Nephlos units), bottled and pasteurized. No sediment or sludge was evident in the carbonating vessel, both diatomaceous earth and polish filtrations were carried out with a minimum of difficulty and the finished beer, in subsequent accelerated aging tests proved to have excellent chill-haze and flavor stability.

EXAMPLE III 25 liters of beer were transferred to storage at 0° C. upon completion of fermentation and 200 p.p.m. aluminum modified hectorite (5 gms.) in 100 ml. water slurry was proportionately injected to insure complete distribution throughout the beer. The beer was rested for 7 days at 0° C. and then filtered to brilliance (10 Nephlos units) with diatomaceous earth into a carbonating vessel and 5 p.p.m. papain (0.125 gm.) with 10 p.p.m. $SO_2$ (0.416 gm. sodium bisulfite-62% available free $SO_2$) dissolved in 50 ml. water was proportionately injected to insure complete distribution throughout the beer. The beer was carbonated to 2.8 volumes carbonation and rested 4 days at 0° C. then polish filtered to brilliance (10 Nephlos units), bottled and pasteurized. No sediment or sludge other than normal yeast precipitate was evident in the storage vessel, both diatomaceous earth and polish filtrations were carried out with a minimum of difficulty and the finished beer in subsequent accelerated aging tests proved to have excellent flavor stability and chill-haze stability.

EXAMPLE IV 25 liters of beer were transferred to storage at 0° C. upon completion of fermentation and 200 p.p.m. magnesium modified hectorite (5 gms.) in 100 ml. water slurry was proportionately injected to insure complete distribution throughout the beer. The beer was rested for seven days at 0° C. and then filtered to brilliance (10 Nephlos units) with diatomaceous earth into a carbonating vessel and 10 p.p.m. bromelin (0.25 gm.) and 25 p.p.m. $SO_2$ (1.04 gms. sodium bisulfite-62% available free $SO_2$) dissolved in 50 ml. water was proportionately injected to insure complete distribution throughout the beer. The beer was carbonated at 2.8 volumes carbonation and rested 4 days at 0° C. then polish filtered to brilliance (10 Nephlos units), bottled and pasteurized. No sediment or sludge other than normal yeast precipitate was evident in the storage vessel, both diatomaceous earth and polish filtrations were carried out with a minimum of difficulty and the finished beer in subsequent accelerated aging tests proved to have excellent flavor stability and chill-haze stability.

EXAMPLE V 25 liters of beer were tansferred to storage at 0° C. upon completion of fermentation and 400 p.p.m. calcium modified hectorite (10 gms.) in 100 ml. water slurry was proportionately injected to insure complete distribution throughout the beer. The beer was rested for 7 days at 0° C. and then filtered to brilliance (10 Nephlos units) with diatomaceous earth into a carbonating vessel and 5 p.p.m. papain (0.125 gm.) with 10 p.p.m. $SO_2$ (0.416 gm. sodium bisulfite-62% available free $SO_2$) dissolved in 50 ml. water was proportionately injected to insure complete distribution throughout the beer. The beer was carbonated to 2.8 volumes carbonation and rested 4 days at 0° C. then polish filtered to brilliance (10 Nephlos units), bottled and pasteurized. No sediment or sludge other than normal yeast precipitate was evident in the storage vessel, both diatomaceous earth and polish filtrations were carried out with a minimum of difficulty and the finished beer in subsequent accelerated aging tests proved to have excellent flavor stability and chill-haze stability.

EXAMPLE VI 25 liters of beer were transferred to storage at 0° C. upon completion of fermentation and 80 p.p.m. calcium modified hectorite (2 gms.) in 100 ml. water slurry was proporionately injected to insure complete distribution throughout the beer. The beer was rested for 7 days at 0° C. and then filtered to brilliance (10 Nephlos units) with diatomaceous earth into a carbonating vessel and 0.1 p.p.m. bromelain (0.0025 gm.) with 5 p.p.m. $SO_2$ (0.208 gm. sodium bisulfite-62% available free $SO_2$) dissolved in 50 ml. water was proportionately injected to insure complete distribution throughout the beer. The beer was carbonated at 2.8 volumes carbonation and rested 4 days at 0° C. then polish filtered to brilliance (10 Nephlos units), bottled and pasteurized. No sediment or sludge other than normal yeast precipitate was evident in the storage vessel, both diatomaceous earth and polish filtrations were carried out with a minimum of difficulty and the finished beer in subsequent accelerated aging tests proved to have excellent flavor stability and chill-haze stability.

*Table I*

| | Percent loss |
|---|---|
| Beer prepared with unmodified hectorite (7 days) | 3.0 |
| Beer prepared with Ex. I modified hectorite (7 days) | 0 |
| Beer prepared with Ex. II modified hectorite (7 days) | 0 |
| Beer prepared with Ex. III modified hectorite (7 days) | 0 |
| Beer prepared with Ex. IV modified hectorite (7 days) | 0 |
| Beer prepared with Ex. V modified hectorite (7 days) | 0 |
| Beer prepared with Ex. VI modified hectorite (7 days) | 0 |

In respect to Table I above, the percent of loss means that amount of the beer which is lost and unrecoverable because of its intimate association with clay, protein and proteinaceous complexes.

It is, therefore, seen by Table I that beer prepared in accordance with the method of the present invention as set forth in Examples I–VI produces a more satisfactory result than when the beer is prepared with unmodified hectorite for seven days. This more satisfactory result is demonstrated in the reduction of loss of beer due to entrapment in the flocculated sludge.

It has been found that the suitable range for the addition of the modified clay is between about 80 and 400 parts per million. The range for the addition of an antioxidant, in most cases $SO_2$ as a bisulfite, for example, is between about 5 and 25 parts per million. The enzyme may be added in the range of between about 3,100 and 6,000 activity units or 0.1 to 10.0 p.p.m.

There may be variations in the process as it has been described, especially with respect to the introduction of the antioxidant and the enzyme. They may be added either before, after or at the same time as the addition of the clay and, as a matter of fact, the antioxidant may be left out altogether, although it is desirable to include it because of its oxygen absorption.

The adsorption of the protein and proteinaceous complexes onto the clay is improved because of the increased contact time of the clay with the liquid to be treated. When the clay is added to the beer it remains evenly dispersed throughout and remains there dispersed for an indefinite time. It therefore has an infinitely higher exposure time than either a process that allows it to settle and rest at the bottom of the tank for a number of days or the process that flocculates the clay in 20–30 minutes and then filters the liquid.

In the claims:

1. A method of treating beer after fermentation has taken place comprising adding an aqueous slurry of a polyvalent metallic ion modified swelling gelling clay to the beer, adsorbing protein and proteinaceous complexes to the clay by allowing the clay to remain evenly dispersed throughout the beer and filtering out the clay and adsorbed material.

2. A method of treating beer after fermentation has taken place comprising adding an aqueous slurry of polyvalent metallic ion modified swelling gelling clay of the montmorillonite family to the beer, adsorbing protein and proteinaceous complexes to the clay by allowing the clay to remain evenly dispersed throughout the beer and filtering out the clay and adsorbed material.

3. A method of treating beer after fermentation has taken place comprising adding an aqueous slurry of polyvalent metallic ion modified hectorite to the beer, adsorbing protein and proteinaceous complexes to the clay by allowing the clay to remain evenly dispersed throughout the beer and filtering out the clay and adsorbed material.

4. A method of treating beer after fermentation has taken place comprising adding an aqueous slurry of polyvalent metallic ion modified swelling gelling clay to the beer, adsorbing protein and proteinaceous complexes to the clay by allowing the clay to remain evenly dispersed throughout the beer, filtering out the clay and adsorbed material, adding a proteolytic enzyme to the beer and finishing the beer.

5. A method of treating beer after fermentation has taken place comprising adding to the beer an aqueous slurry of a polyvalent metallic ion modified swelling gelling clay in an amount of about 80 to 400 parts per million, adsorbing protein and proteinaceous complexes to the modified clay by allowing the modified swelling gelling clay to remain evenly dispersed throughout the beer for a period in excess of 24 hours, filtering the beer to remove the clay and adsorbed material, adding about 0.1 to 10.0 p.p.m. of proteolytic enzyme, resting the beer and finishing the beer.

6. A method of treating beer after fermentation has taken place comprising adding to the beer an aqueous slurry of a polyvalent metallic ion modified swelling gelling clay of the montmorillonite family in an amount of about 80 to 400 parts per million, adsorbing protein and proteinaceous complexes to the modified clay by allowing the modified clay to remain evenly dispersed throughout the beer for a period in excess of about 24 hours while the beer stands, filtering the beer to remove the clay and adsorbed material, adding about 0.1 to 10.0 p.p.m. of proteolytic enzyme, resting the beer and finishing the beer.

7. A method of treating beer after fermentation has taken place comprising adding to the beer an aqueous slurry of polyvalent metallic ion modified hectorite in an amount of about 80 to 400 parts per million, adsorbing protein and proteinaceous complexes to the modified hectorite by allowing the modified hectorite to remain evenly dispersed throughout the beer for a period in excess of about 24 hours, filtering the beer to remove the hectorite and adsorbed material, adding about 0.1 to 10.0 parts per million of a proteolytic enzyme, resting the beer and finishing the beer.

8. A method of treating beer after fermentation has taken place comprising adding to the beer an aqueous slurry of a polyvalent metallic ion modified swelling gelling clay of the montmorillonite family in an amount of about 80 to 400 parts per million, adsorbing protein and proteinaceous complexes to the modified clay by allowing the modified clay to remain evenly dispersed throughout the beer for a period in excess of about 24 hours while the beer stands, filtering the beer to remove the clay and adsorbed material, adding about 0.1 to 10.0 p.p.m. of proteolytic enzyme, adding about 5 to 25 p.p.m. of a compound selected from the group consisting of sulfur dioxide and sodium bisulfite, resting the beer and finishing the beer.

9. A method of treating beer after fermentation has taken place comprising adding to the beer an aqueous slurry of polyvalent metallic ion modified hectorite in an amount of about 80 to 400 parts per million, adsorbing protein and proteinaceous complexes to the modified hectorite by allowing the modified hectorite to remain evenly dispersed throughout the beer for a period in excess of about 24 hours, filtering the beer to remove the hectorite and adsorbed material, adding about 0.1 to 10.0 parts per million of proteolytic enzyme, adding about 5 to 25 p.p.m. of a compound selected from the group consisting of sulfur dioxide and sodium bisulfite, resting the beer and finishing the beer.

References Cited in the file of this patent

UNITED STATES PATENTS

| | | |
|---|---|---|
| 508,882 | Horabostel | Nov. 14, 1893 |
| 2,407,006 | Wallerstein et al. | May 10, 1949 |
| 2,811,449 | Witwer et al. | Oct. 29, 1957 |
| 2,916,377 | Shaler | Dec. 8, 1959 |